(12) United States Patent
Jäger

(10) Patent No.: US 6,511,055 B2
(45) Date of Patent: Jan. 28, 2003

(54) APPARATUS FOR SECURING WATER AERATING DEVICES TO AIR SUPPLY CONDUITS

(76) Inventor: Andreas Jäger, Aussiger Wende 11, D-30625 Hanover (DE)

(*) Notice: Subject to any disclaimer, the term of this patent is extended or adjusted under 35 U.S.C. 154(b) by 0 days.

(21) Appl. No.: 09/934,934

(22) Filed: Aug. 21, 2001

(65) Prior Publication Data

US 2002/0033544 A1 Mar. 21, 2002

(30) Foreign Application Priority Data

Aug. 21, 2000 (DE) .......................... 100 41 147

(51) Int. Cl.⁷ .................................. B01F 3/04
(52) U.S. Cl. ...................... 261/122.1; 261/124
(58) Field of Search .................. 261/121.1, 122.1, 261/122.2, 124, DIG. 70; 210/220

(56) References Cited

U.S. PATENT DOCUMENTS

| | | | | |
|---|---|---|---|---|
| 3,790,142 A | * | 2/1974 | Goodman et al. ......... 261/124 |
| 3,953,555 A | * | 4/1976 | Gley ........................... 261/124 |
| 3,954,922 A | * | 5/1976 | Walker et al. ........ 261/DIG. 70 |
| 4,820,412 A | * | 4/1989 | Meyer-Rudolphi et al. ...... 261/DIG. 70 |
| 5,183,595 A | * | 2/1993 | Schussler .................. 261/122.2 |

FOREIGN PATENT DOCUMENTS

| | | | |
|---|---|---|---|
| DE | 36 00 232 A1 | * 7/1987 | ............. 261/122.2 |
| JP | 61-44557 | * 10/1986 | ............. 261/122.1 |

* cited by examiner

Primary Examiner—C. Scott Bushey
(74) Attorney, Agent, or Firm—R W Becker & Associates; R W Becker

(57) ABSTRACT

An apparatus for securing an aerating device, for aerating water with fine bubbles, to an air supply conduit is provided. The aerating device is detachably connected to a mounting that is secured to an air supply conduit. The mounting is provided with an undercut groove into which engages the projection of the aerating device in the manner of a dovetail connection, thereby providing a horizontal insertion movement of the aerating device.

10 Claims, 3 Drawing Sheets

APPARATUS FOR SECURING WATER AERATING DEVICES TO AIR SUPPLY CONDUITS

BACKGROUND OF THE INVENTION

The present invention relates to an apparatus for securing aerating devices, for aerating water with fine bubbles, to air supply conduits. The aerating devices are secured to the air supply line by means of a mounting, whereby the aerating devices are detachably connected to the mounting and are supplied with air via this mounting.

With the heretofore known apparatus of this type, the aerating device is provided with a tubular connector that is connected with the mounting by a screw thread. Especially with elongated aerating devices, this type of fastening not only takes too much time, but is also connected with the drawback that it is almost impossible to carry out the necessary thread movement for effecting a fastening due to the presence of adjacent devices.

It is therefore an object of the present invention to provide an apparatus of the aforementioned general type according to which all aerating devices that are possible can be rapidly and reliably secured to the mounting.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
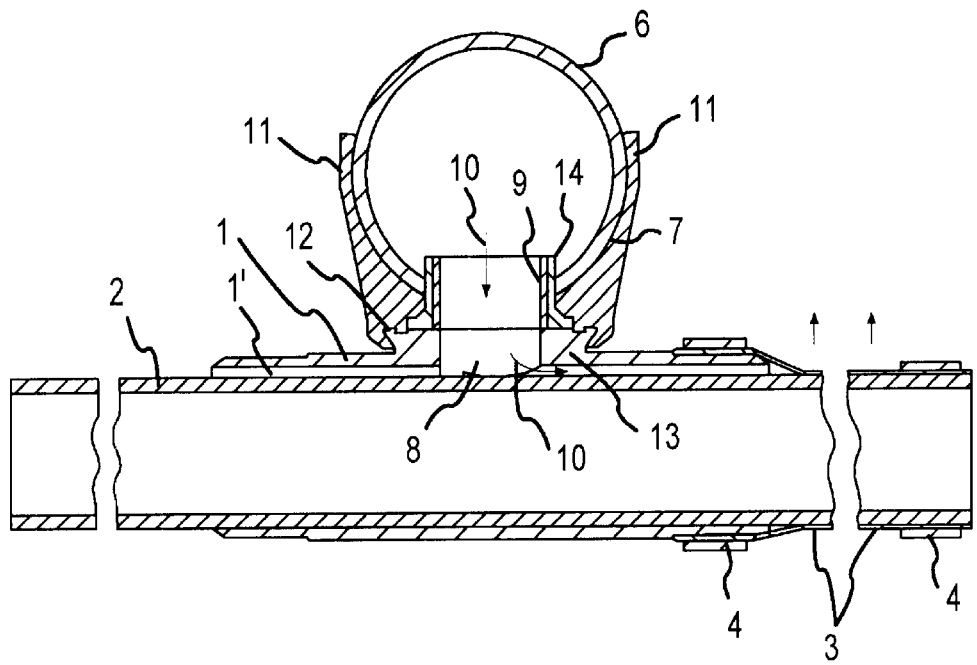
FIG. 1 is a cross-sectional view through one exemplary embodiment of an inventive apparatus for securing an elongated, tubular aerating device to a collector tube.
Figure 2:
FIG. 2 is a partial top view of an active portion of the aerating device that gives off small air bubbles.
Figure 3:
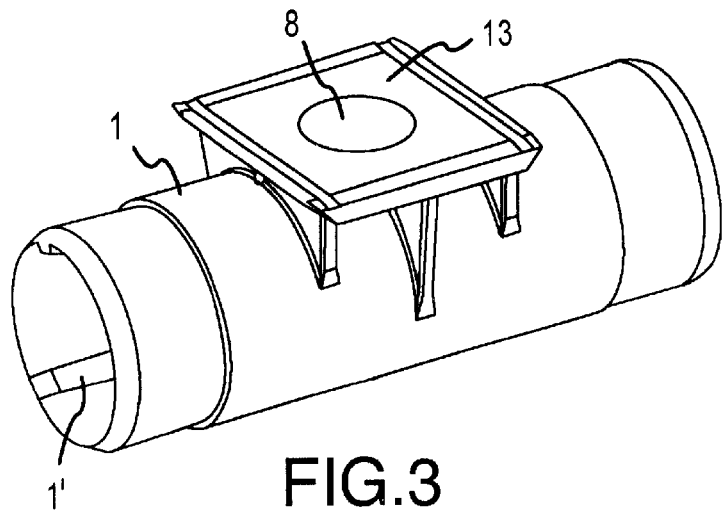
FIG. 3 is an isometric view of the portion of the aerating device that is provided for the connection location.
Figure 4:
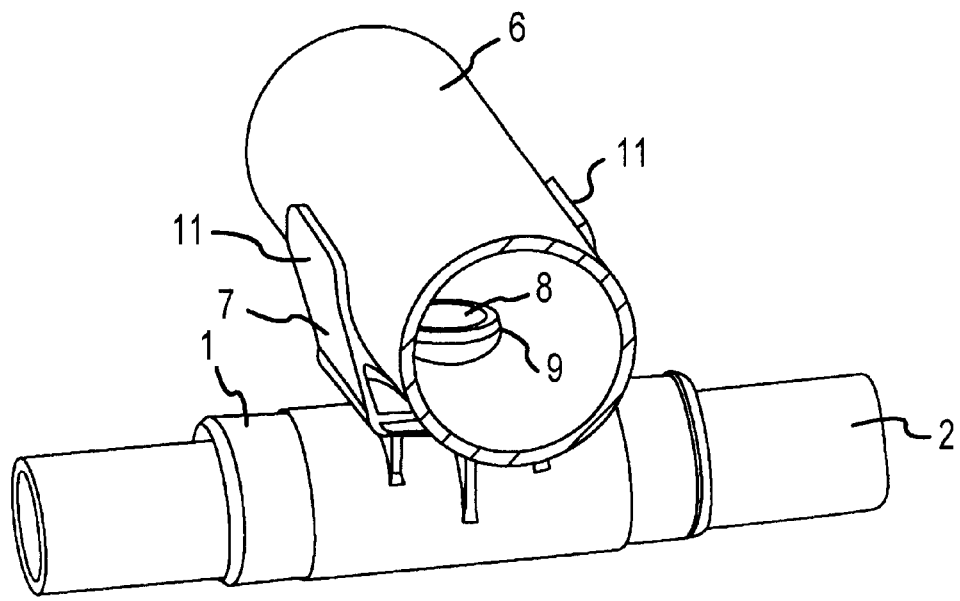
FIG. 4 is an isometric view showing the connection location between the collector tube and the aerating device.

The apparatus of the present invention is characterized primarily in that the mounting is provided with at least one linearly extending, groove-like, laterally undercut recess into which can be inserted a projection on the aerating device, which projection corresponds to the cross-section of the recess, in order in this way to be able to provide a connection between the mounting and the aerating device by means of a horizontal insertion movement. In this connection, it is also possible to provide the recess on the air supply device and the corresponding projection on the mounting. It is particularly advantageous in this connection if the connection is embodied as a dovetail connection.

In order in addition to be able to provide an adequate sealing of the air passage relative to the water in the region of the connection location, a seal is provided that extends into the insertion path and is sealingly deformable during the insertion process. As a consequence of the deforming seal, not only is a sealing effect achieved, but in addition at the same time a fixation of the connection is achieved that, however, in certain cases can also be reinforced by further fixation means, such as small screws.

The securement of the mounting on the air supply conduit (the connector conduit) can also be detachable by means of clamps or hooks. However, it is also possible to provide the mounting with thin arms that can be connected to the wall of the air supply line by being screwed or glued thereto.

Although the aerating devices can be embodied as elongated tubes, it is also possible to use plate-shaped aerating devices and further tubular ends that lead directly to an aerating device or are a component thereof. In this connection, the aerating devices can be mounted above and/or below the air supply conduit. In all cases the aforementioned advantages are achieved as a consequence of the present invention.

Further specific features of the present invention will be described in detail subsequently.

DESCRIPTION OF PREFERRED EMBODIMENTS

Referring now to the drawing in detail, the aerating device essentially comprises a holding tube 1, which is provided on the inside with spacer ribs 1', a carrying tube 2 that projects beyond both ends of the holding tube 1, and a thin hose 3 of rubber or similar elastomeric material that tightly surrounds the carrying tube 2. The hose 3 is held on the end of the holding tube 1 and on the end of the carrying tube 2 by means of clamping rings or collars 4 that are disposed at that location. The hose 3 is furthermore provided with a plurality of small slits 5 through which fine air bubbles can escape into the water. The slits 5 open under the effect of internal air pressure, and close when the internal pressure has dropped below a certain level.

The supply of air is effected via a hard conduit 6 of polymeric material (collector tube) that forms the air supply conduit for generally a plurality of aerating devices. Secured to the polymeric conduit 6 is a mounting 7 with which the holding tube 1 is detachably connectable.

The holding tube 1 is provided with a radially extending hole or bore 8 via which, from the polymeric conduit 6, the slightly compressed air, via a sleeve 9 that projects into the conduit 6, passes in the direction of the arrows 10 between the holding tube 1 and the carrying tube 2, and finally passes between the carrying tube 2 and the two hoses 3, from which, as indicated above, the air passes into the water.

The mounting 7, which is made of polymeric material, is provided with two thin arms 11 that rest upon the outside of the polymeric conduit 6; the arms 11 are fixedly connected to the conduit 6, for example by being glued thereto. However, this connection could also be established or reinforced by screws or bolts that pass through the arms or walls 11. In addition, the underside of the mounting 7 is provided with an elongated or linearly extending, laterally undercut groove or recess 12 (trapezoidal or tapered groove) that serves for receiving a correspondingly shaped, i.e. trapezoidal, projection 13 of the holding tube 1. In this connection, the elements 12, 13 expediently extend transverse to the holding tube 1, in other words, in the direction of the polymeric conduit 6 which is directed at right angles to the holding tube 1; on the whole, the elements 12, 13 are disposed essentially in a horizontal plane.

For purposes of sealing and for fixing the dovetail connection, the rigid sleeve 9 is surrounded by a seal 14 that is made of rubber or the like and that has a thicker bottom. The dimension of this seal is such that its bead-like thickened portion at the bottom extends into the path of the projection 13 prior to the establishment of the dovetail connection. At the same time, the seal 14 also rests sealingly against the rim of the opening of the polymeric conduit 6 that is provided for receiving the seal 14 and the sleeve 9. This ensures that the air supplied from the polymeric conduit 6 can pass only under the hose 3. If the connection is now established, i.e. the projection 13 is inserted, the seal 14 is elastically deformed, thereby providing a sealing and holding effect.

This embodiment of the apparatus has the great advantage that the polymeric conduit 6 can be provided at desired locations with a mounting 7. The already assembled parts of the aerating device (the parts 1, 13, 2, 3 and 4) can then be easily connected with the mounting 7 by insertion.

Figure 5:
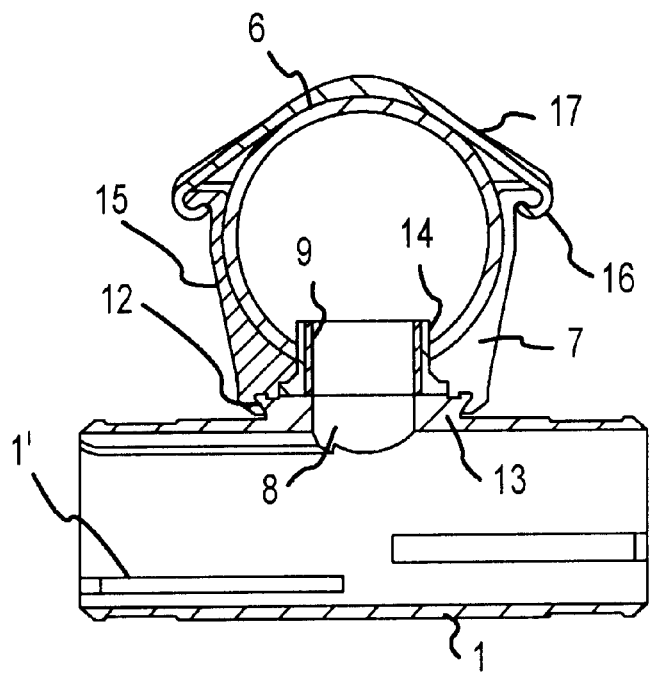
FIG. 5 shows a modified exemplary embodiment of the apparatus of FIG. 1 having a different connection between the air supply tube and the mounting for the securement of the aeration device.

As shown in the embodiment illustrated in FIG. 5, instead of the glued and/or screwed-on arms 11, arms 15 that at the upper end have a hook-like configuration can be used. The end hook 16 of clamps 17 engage the hooks of the arms 15 with tension; the clamps 17 span the polymeric conduit 6 in order in this way to also achieve a detachability of the mounting 7.

All of the components of the apparatus, with the exception of the seal 14, are embodied as molded polymeric parts, whereby however the clamp 17 must be elastically bendable.

Figure 6:
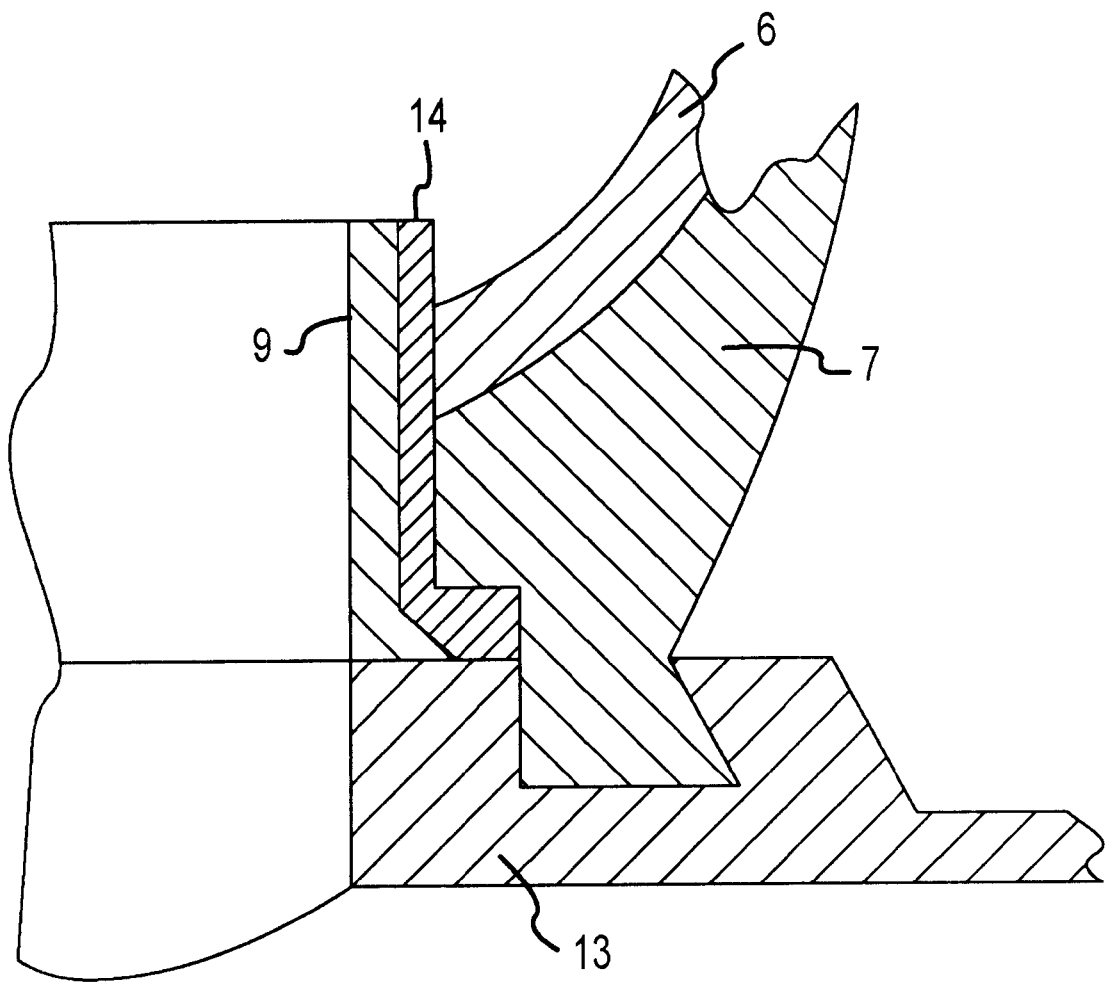
FIG. 6 is a detail view of FIG. 5 showing a connection between the mounting and the aerating device.

FIG. 6 is a detail view of FIG. 5 wherein the projection in on the mounting and the recess is on the aerating device.

The specification incorporates by reference the disclosure of German priority document DE 100 41 147.9 of Aug. 21, 2000.

The present invention is, of course, in no way restricted to the specific disclosure of the specification and drawing, but also encompasses any modifications within the scope of the appended claims.

What I claim is:

1. An apparatus for securing an aerating device, for aerating water with fine bubbles, to an air supply conduit, comprising:

a mounting for securing an aerating device to an air supply conduit for receiving air therefrom, wherein said aerating device is detachably connectable to said mounting, for which purpose one of said mounting and said aerating device is provided with at least one linearly extending, grooved, laterally undercut recess into which is insertable a projection of the other of said aerating device and said mounting, wherein said projection has a cross-sectional configuration that corresponds to that of said recess.

2. An apparatus according to claim 1, wherein said connection, which is a positive connection between said mounting and said aerating device, is disposed at least essentially in a horizontal plane.

3. An apparatus according to claim 1, wherein said connection between said mounting and said aerating device is embodied in the manner of a dovetail connection.

4. An apparatus according to claim 1, wherein said mounting is provided with arms that rest on an outside of said air supply conduit and are fixedly connected at that location by at least one of being glued and screwed thereto.

5. An apparatus according to claim 1, wherein said mounting is provided with arms that are provided with hooks on ends thereof that can be hooked into clamps having hook ends, wherein said clamps span said air supply conduit.

6. An apparatus according to claim 1, wherein prior to insertion of said projection into said recess a seal of elastomeric material is disposed in said recess, and wherein said seal is elastically deformable upon insertion of said projection into said recess.

7. An apparatus according to claim 1, wherein said connection between said mounting and said aerating device is, for elongated aerating devices, disposed above said aerating device.

8. An apparatus according to claim 1, wherein said connection between said mounting and said aerating device, where said aerating device is plate-shaped, is disposed below said aerating device.

9. An apparatus according to claim 6, wherein a rigid, hollow cylindrical sleeve is disposed in an opening in said air supply conduit, and wherein said seal has a thicker portion that faces said mounting, extends into said air supply conduit, and sealingly rests against an adjacent edge or rim of said opening of said air supply conduit.

10. An apparatus according to claim 1, wherein said air supply conduit is provided with spaced apart, fixedly mounted mountings, and wherein aerating devices are provided as closed units for respective connection to a given mounting.

* * * * *